March 10, 1925.  1,529,581
J. A. DWYER
EXTRICATING DEVICE
Filed Oct. 24, 1924
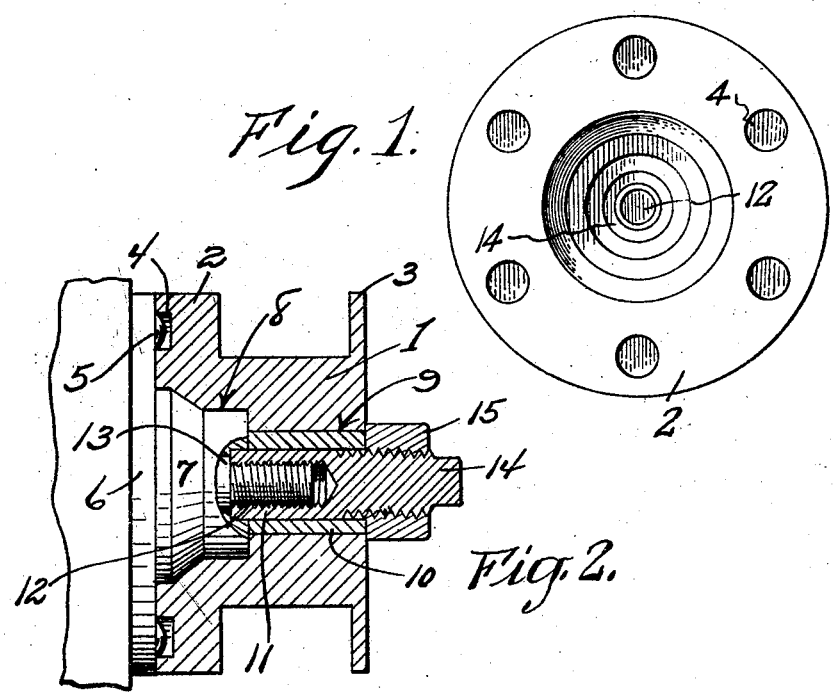
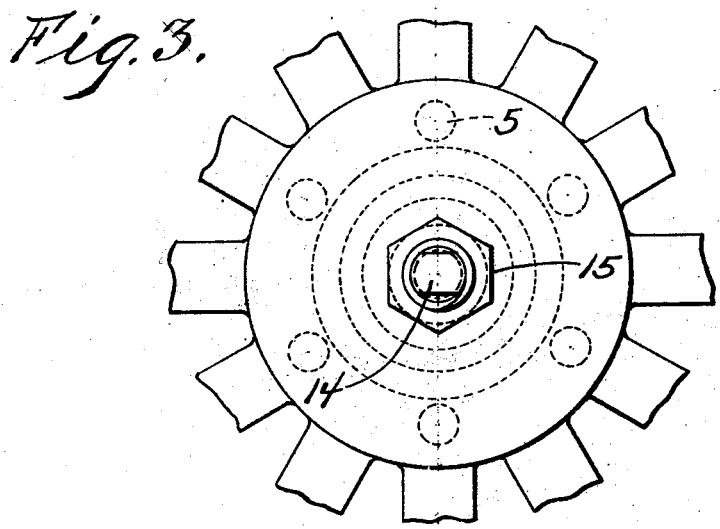
J. A. Dwyer
INVENTOR Patented Mar. 10, 1925.

1,529,581

UNITED STATES PATENT OFFICE.

JAMES A. DWYER, OF BLACKWELL, OKLAHOMA.

EXTRICATING DEVICE.

Application filed October 24, 1924. Serial No. 745,631.

*To all whom it may concern:*

Be it known that I, JAMES A. DWYER, a citizen of the United States, residing at Blackwell, in the county of Kay and State of Oklahoma, have invented new and useful Improvements in Extricating Devices, of which the following is a specification.

My present invention has reference to a means whereby a mired vehicle may, through its own power, extricate itself from a rut.

A further object is the provision of simple means for this purpose in the nature of a pulley, which may be conveniently carried in the car when not required for use, and which may be rigidly secured on the hub of the power wheel of a mired vehicle, the said pulley designed to have wound therearound and secured thereto a cable whose outer end is directly connected to a stump, pole or other support, or which end may be trained around a pulley on such support and attached to the front of the vehicle, and whereby the turning of the shaft will wind the cable on the pulley and draw the machine out of the rut.

The drawings which accompany and form part of this application, illustrate a satisfactory embodiment of the improvement, and wherein:—

Figure 1 is a rear elevation of the improvement.

Figure 2 is a central transverse sectional view through the improvement, showing the same arranged upon the hub of the power shaft of an automobile.

Figure 3 is a front elevation of the improvement.

My improvement is comparatively small, so that the same can be conveniently arranged under the seat or stored in any convenient place in an automobile. The cable employed in connection with the pulley of the improvement, may be used for hauling disabled vehicles when not arranged around the pulley and is therefore also of such size to be conveniently stored in the vehicle.

The improvement, as above stated, is in the nature of a pulley and is indicated by the numeral 1. The pulley has its inner face formed with a flange 2 that is thicker than its outer flange 3, and the said flange 2 is provided with spaced circumferentially arranged depressions 4, corresponding in number and of a size to snugly receive therein the heads of the bolts 5 that pass through the flange 6 of the hub 7 and secure the same on the wheel. The body of the pulley 1, from its inner face, is provided with a socket 8 shaped to correspond with the shape of the projecting portion of the hub 7. The body 1 of the pulley is centrally formed with an opening 9 that communicates with its bore 8. In this opening there is received a sleeve 10 which may be of harder metal than that of the pulley 1. Also received in the sleeve 10 and having its inner and socket end 11 threadedly engaging the threaded projection 12 on the axle 13 of the automobile there is a bolt member 14. The bolt member has its outer end provided with exterior threads and these threads are engaged by a locking washer 15 which contacts with both the outer end of the sleeve 10 and the pulley 1. By screwing the nut 15 home on the bolt 14, the pulley will be forced against the hub flange 6 so that the bolt heads 5 will be not only received in but forced in contact with the walls provided by the depressions 4.

The operation of the improvement is well known to those skilled in the art to which such inventions relate, a cable being fixed on the pulley and secured to a stationary object, and the engine is started to wind the cable on the pulley, and thereby draw the machine out of a rut.

Having described the invention, I claim:—

1. A means for extricating automobiles from ruts, in which the hub cap and the sustaining nuts have been removed respectively from the hub and axle of a drive wheel of an automobile, said means comprising a pulley having its inner face formed with circumferential depressions to receive therein the heads of the bolts of the hub flange and having a central depression to receive the projecting end of the hub therein, said pulley having a central opening in which the threaded end of a shaft is received, a bolt having an inner threaded bore screwed on the shaft projection and its outer portion projecting through the pulley and threaded, a binding nut screwed on the said threaded end of the bolt and contacting with the pulley, and said pulley designed to have a cable arranged therearound and secured thereto.

2. A means for extricating mired automobiles, in which the hub cap and the drive axle securing nuts are removed, said means comprising a pulley having its inner flange thickened and its inner face provided with spaced depressions to receive the heads of the hub flange securing means therein, said pulley having a bore entering from its inner face and corresponding in shape to the projecting portion of the hub and receiving the said portion of the hub therein, said pulley having a central opening in which is received the projecting and threaded end of the drive shaft of the automobile, a sleeve in said opening, a bolt having an inner threaded bore received in the sleeve and screwed on the threaded end of the axle, said bolt having its outer end exteriorly threaded end projecting beyond the pulley, and a binding nut screwed thereon to contact with the outer end of the sleeve and with the outer face of the pulley.

In testimony whereof I affix my signature.

JAMES A. DWYER.